Figure 4:
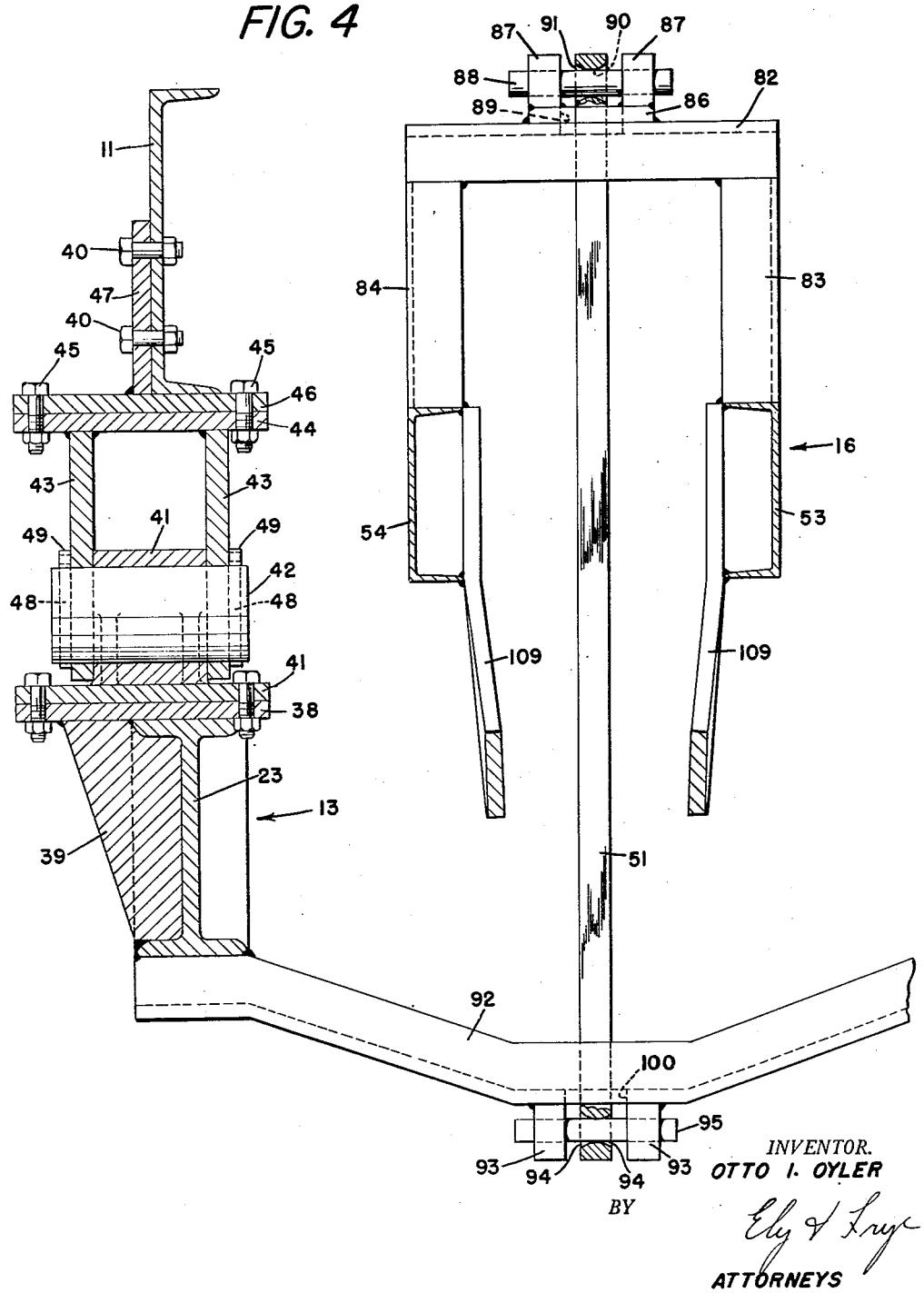

May 28, 1957 O. I. OYLER 2,793,873
ARTICULATED WHEEL SUSPENSION FOR A VEHICLE
Filed April 12, 1951 9 Sheets-Sheet 1
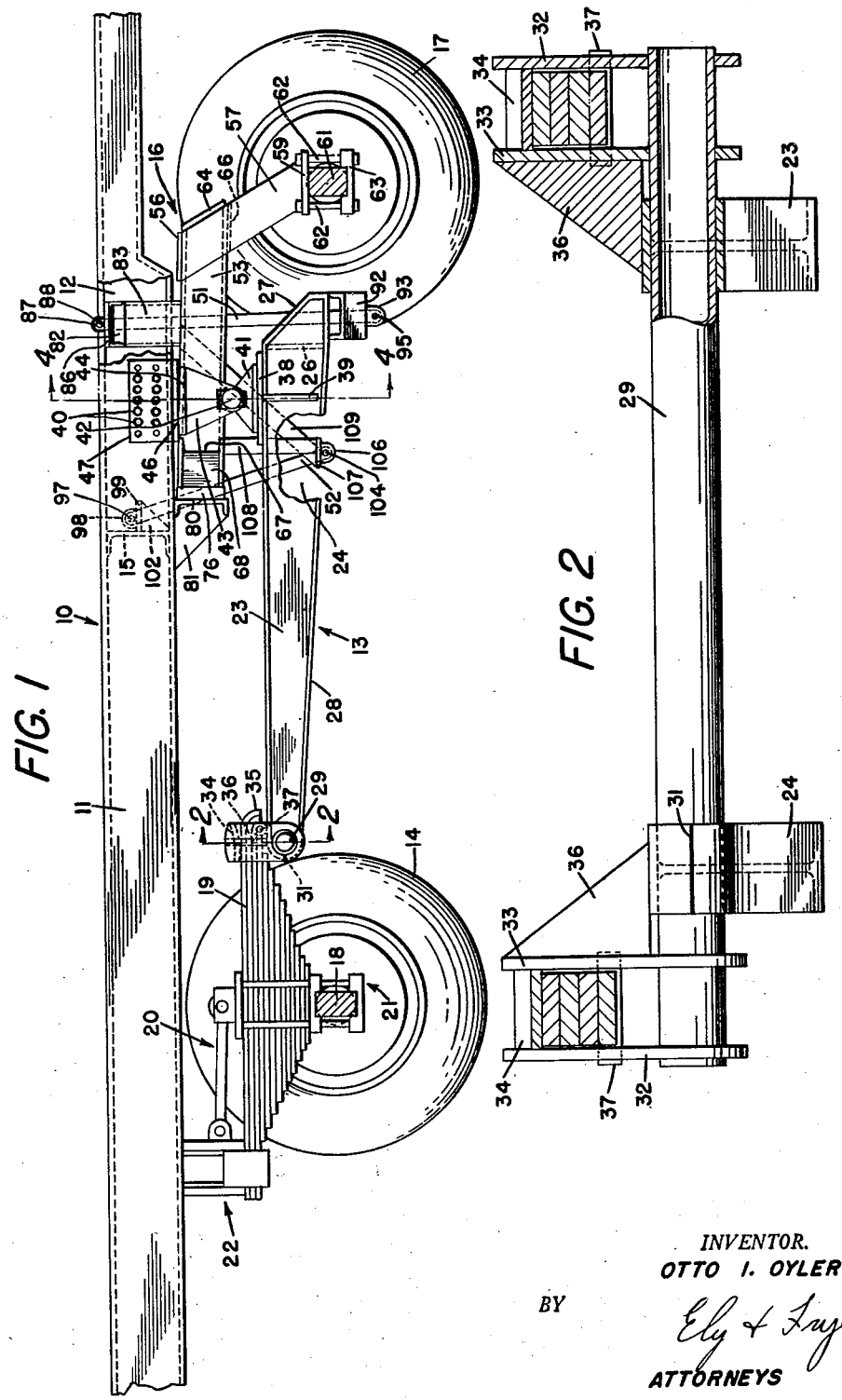
INVENTOR.
OTTO I. OYLER
BY
ATTORNEYS

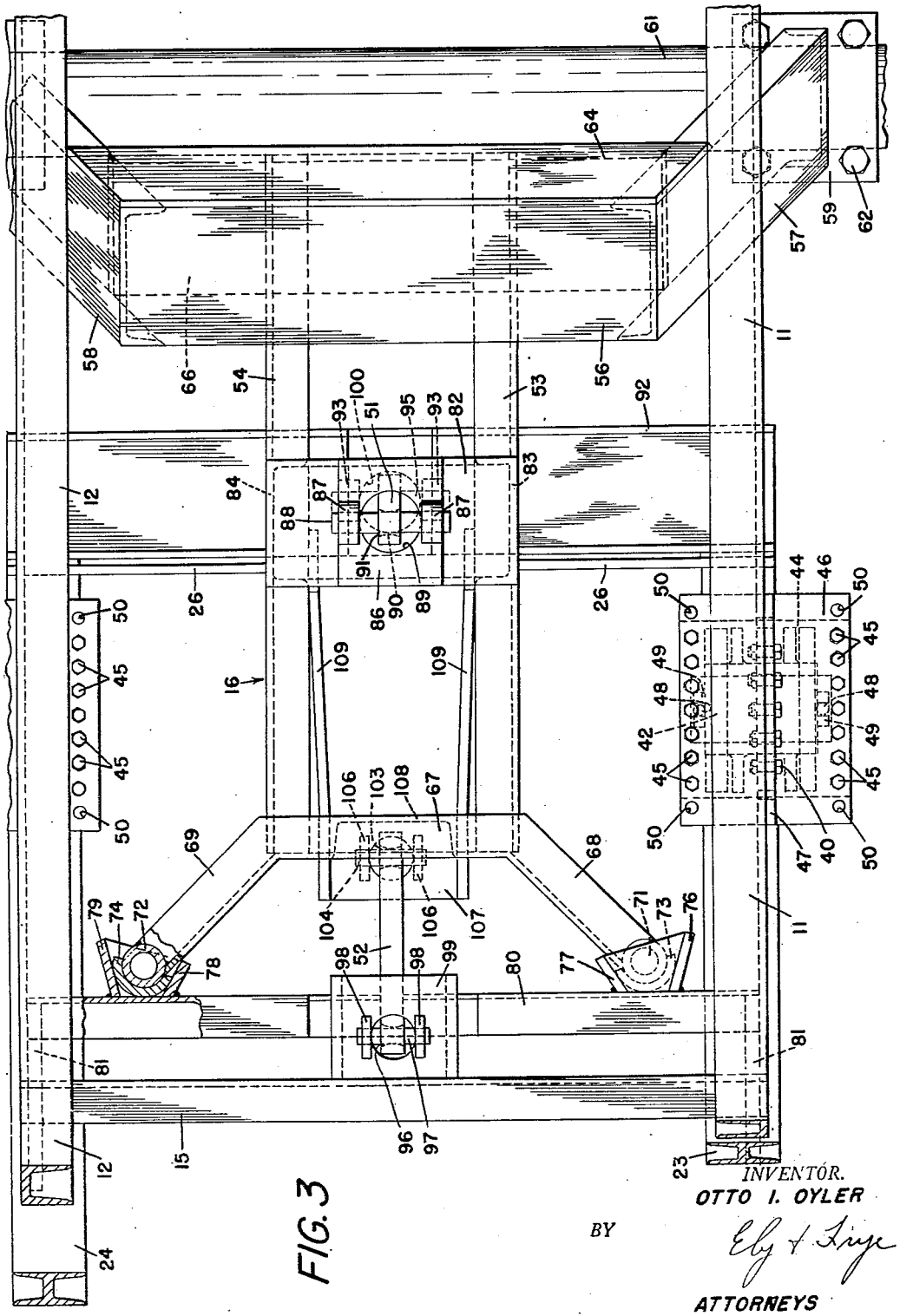
FIG. 3
INVENTOR.
OTTO I. OYLER
BY
ATTORNEYS

INVENTOR.
OTTO I. OYLER

May 28, 1957 O. I. OYLER 2,793,873
ARTICULATED WHEEL SUSPENSION FOR A VEHICLE
Filed April 12, 1951 9 Sheets-Sheet 5
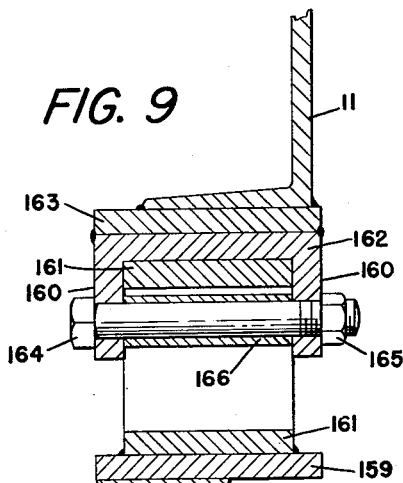
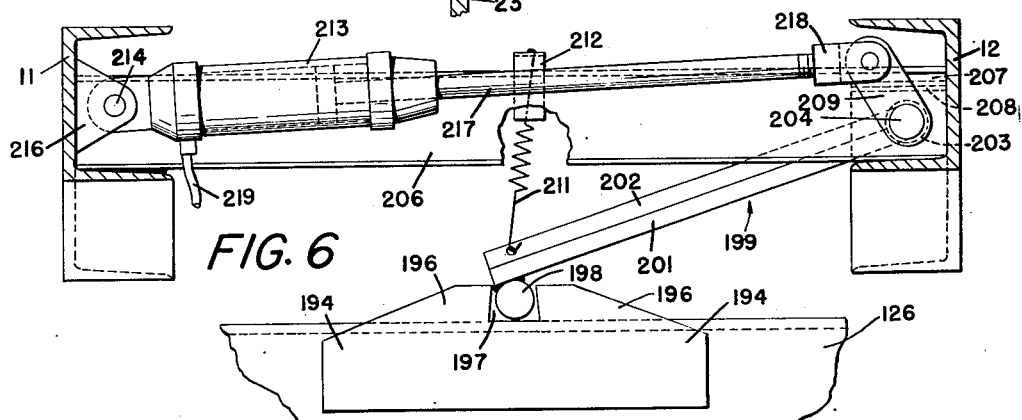
INVENTOR.
OTTO I. OYLER
BY
Ely + Luye
ATTORNEYS May 28, 1957 O. I. OYLER 2,793,873
ARTICULATED WHEEL SUSPENSION FOR A VEHICLE
Filed April 12, 1951 9 Sheets-Sheet 6
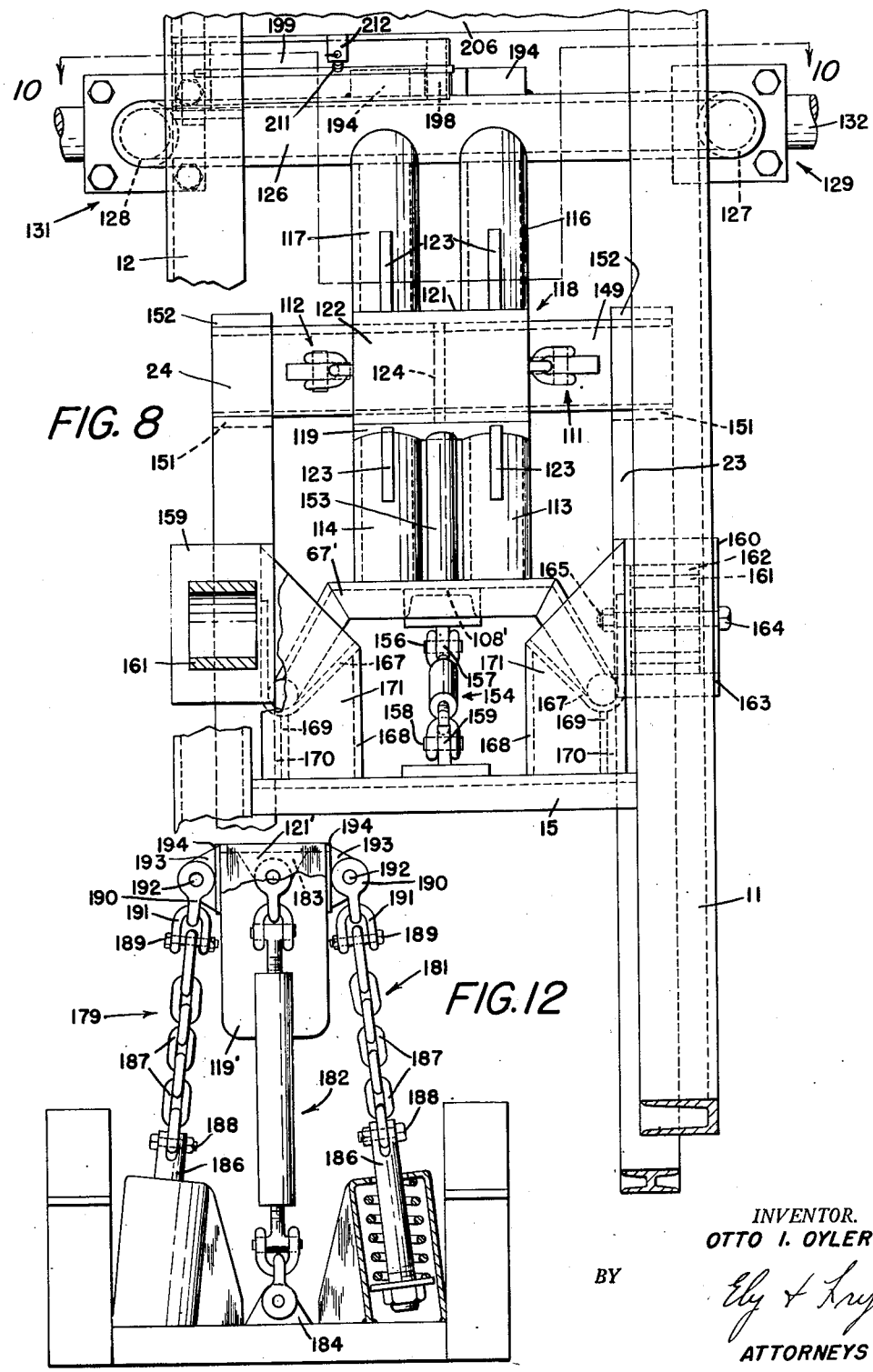
INVENTOR.
OTTO I. OYLER
BY
ATTORNEYS May 28, 1957     O. I. OYLER     2,793,873
ARTICULATED WHEEL SUSPENSION FOR A VEHICLE Filed April 12, 1951     9 Sheets-Sheet 7

INVENTOR.
OTTO I. OYLER
BY
ATTORNEYS

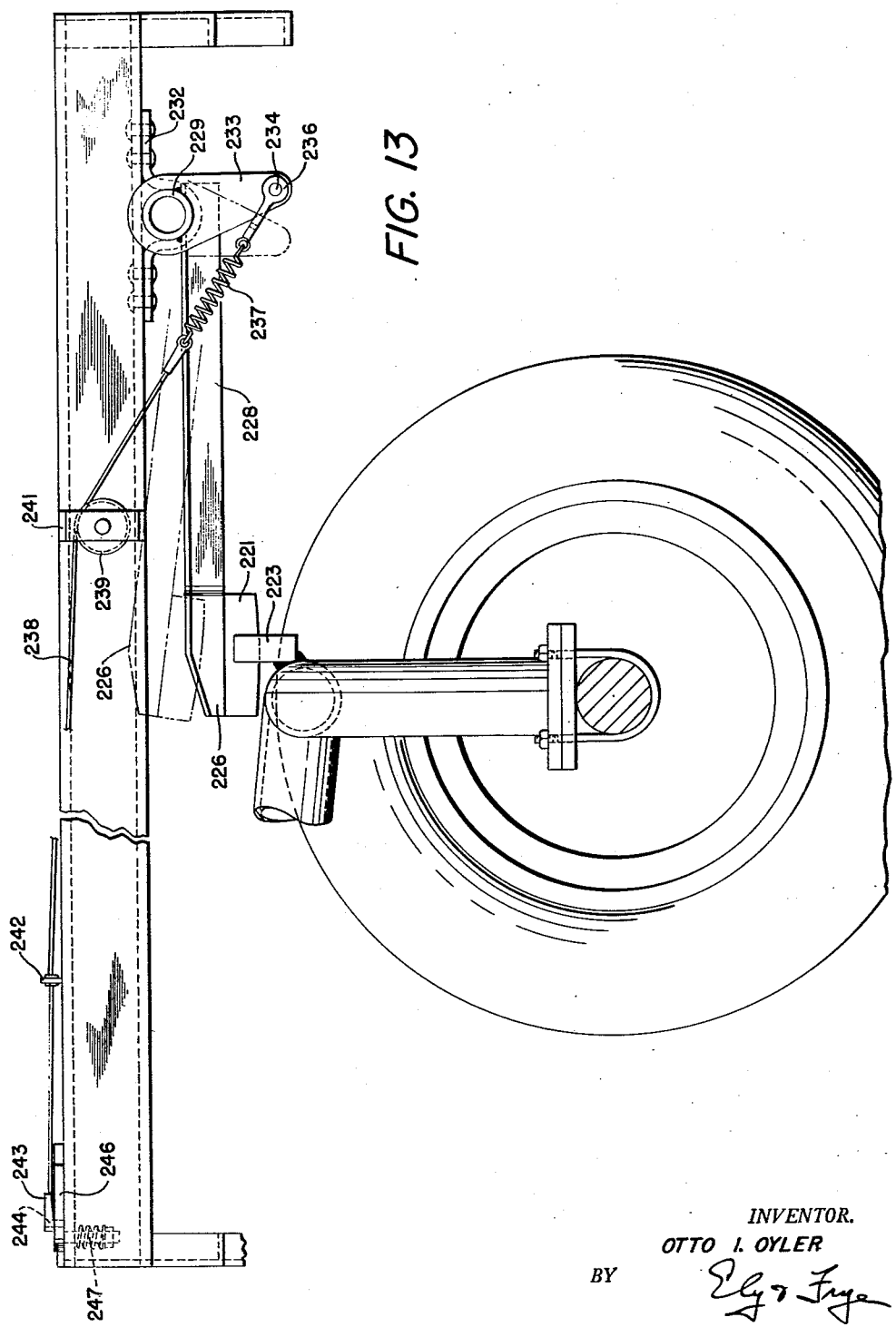

May 28, 1957 O. I. OYLER 2,793,873
ARTICULATED WHEEL SUSPENSION FOR A VEHICLE
Filed April 12, 1951 9 Sheets-Sheet 9

INVENTOR.
OTTO I. OYLER
BY
ATTORNEYS

United States Patent Office 2,793,873
Patented May 28, 1957

2,793,873

ARTICULATED WHEEL SUSPENSION FOR A VEHICLE

Otto I. Oyler, Canton, Ohio

Application April 12, 1951, Serial No. 220,655

16 Claims. (Cl. 280—104.5)

This invention relates to a vehicle suspension and, in particular, to a trailer suspension of the type shown in my prior Patent No. 2,460,429, wherein dual bogies are employed in tandem, with the front bogie mounted for pitching motion on a main trunnion on the trailer chassis and with the rear bogie having a universal connection with said chassis and with the front bogie, respectively.

In the business of trucking, increasing the pay load is the most important consideration. Solutions to this problem must take account of modern laws relating to highway traffic, which impose limitations on axle loads, prohibiting loading beyond a set maximum for any single axle. Thus, the use of dual axles of any form or construction whatever will permit increased total loads. However, a dual axle arrangement in its simplest form, with the axles fixed in mutual parallelism, whether or not the wheel suspension as a whole is rotatable on a vertical axis, is not satisfactory for several reasons. For one thing, it is dangerous because the tires tend to continue in a straight line when the vehicle is rounding a turn, which creates a drag, requiring increased power amounting up to 200% of normal, and causes excessive wear in the tire tread. Furthermore, the arrangement is dangerous in that it tends to pull the tractor off the road when the latter is slippery.

One favorable aspect of highway regulations is that greater load per axle is permitted with greater span between the axles. However, any increase in the inter-axle distance magnifies the aforementioned difficulties. By the construction shown and claimed in my aforesaid patent, I have been able to materially increase the distance between bogie axles, due to a flexibility in the arrangement which permits perfect tracking of the tandem sets of bogie wheels, in respect to each other as well as in respect to the other sets of wheels on the vehicle.

However, the arrangement shown in my said patent involved massive and numerous parts, which were costly both in relation to original outlay of materials and labor and in respect to the amount of tare, which is subtracted directly from permissible pay load.

I have found that by attaching the spring on the axle of the front bogie to the trailer chassis, the framework of the said front bogie may be materially shortened in length, with resultant reduction of requirements of strength, and hence of weight, without sensibly detracting from the bogie action obtained in the prior form of the suspension. Furthermore, the present form enables positioning of the main trunnion axis further toward the rear of the trailer, which also presents advantages. No less important is the fact that, whereas in the prior form, in adapting the bogies to existing trailers, a special spring had to be employed, the present arrangement may be attached to the spring which is already a part of the trailer chassis being modified.

Also, whereas the original form of universally connected bogies employed a single hanger between the bogies, the present construction employs a pair of hangers which are effective to curtail side rocking, or rolling, of the trailer on turns or on uneven stretches of road.

It is therefore a principal object of the invention to provide a form of universally interconnected, tandem bogies which will permit substantial reductions in the dimensions of the parts thereof, and hence reduction in dead weight hauled. A further object is to accomplish the foregoing object without detracting from the flexibility of the bogie system. Other objects are to avoid the need for vertical guides for the front end of the front bogie, permit relocation of the main trunnion further rearward of the trailer, and minimize rolling or side leaning of the trailer.

Figure 5:
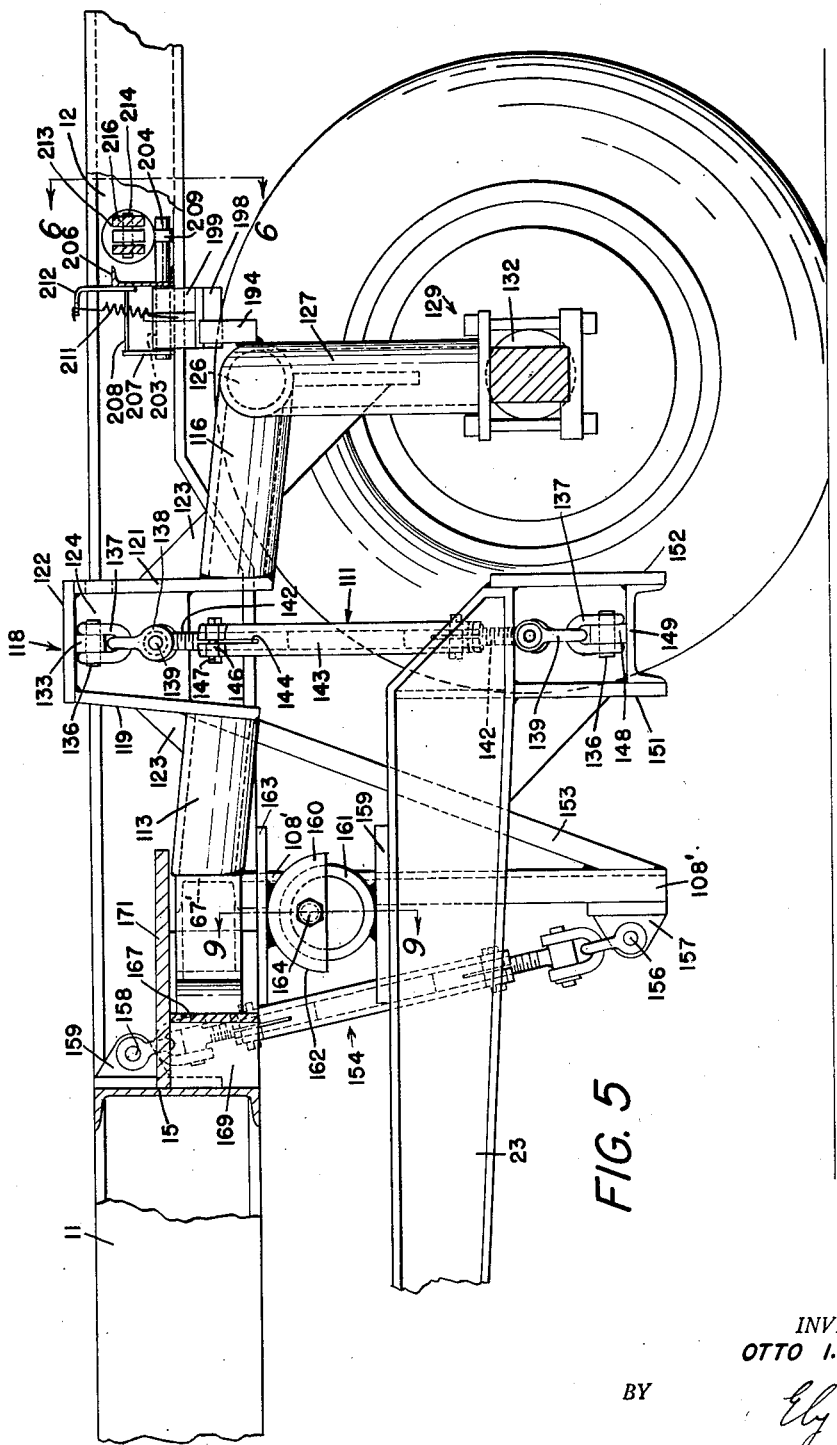
Figure 10:
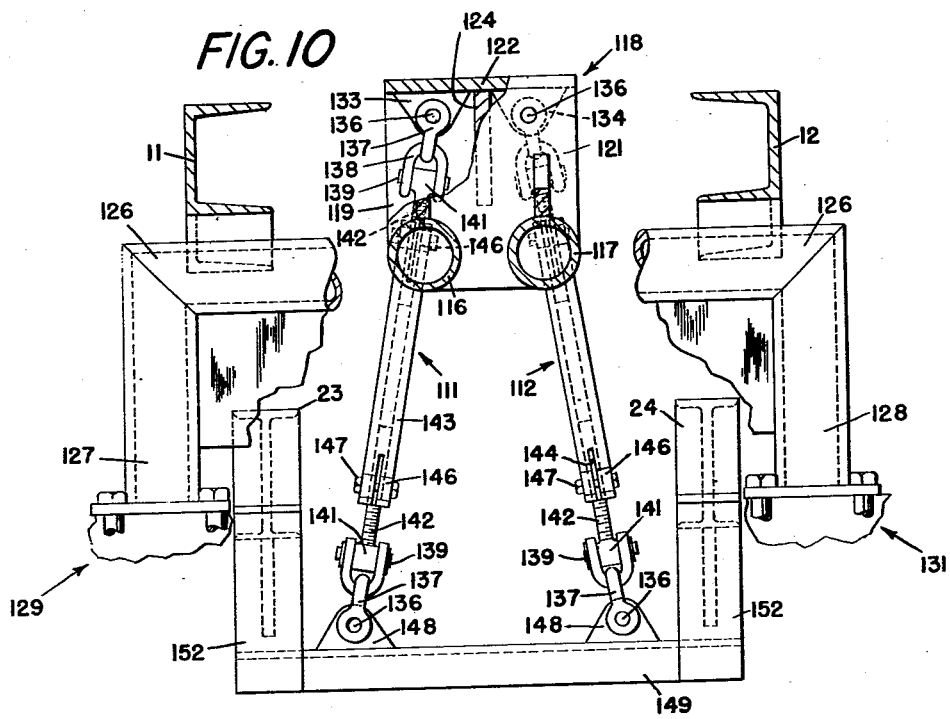
Figure 11:
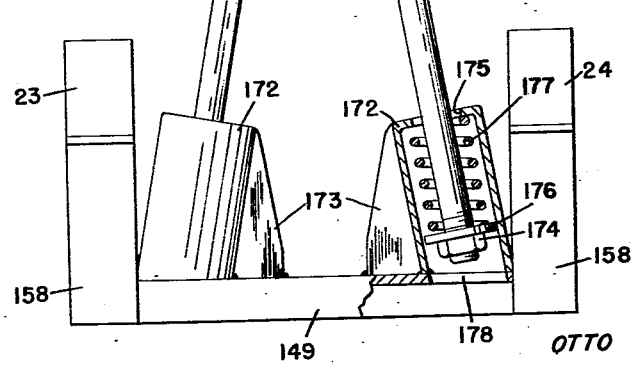
Figure 14:
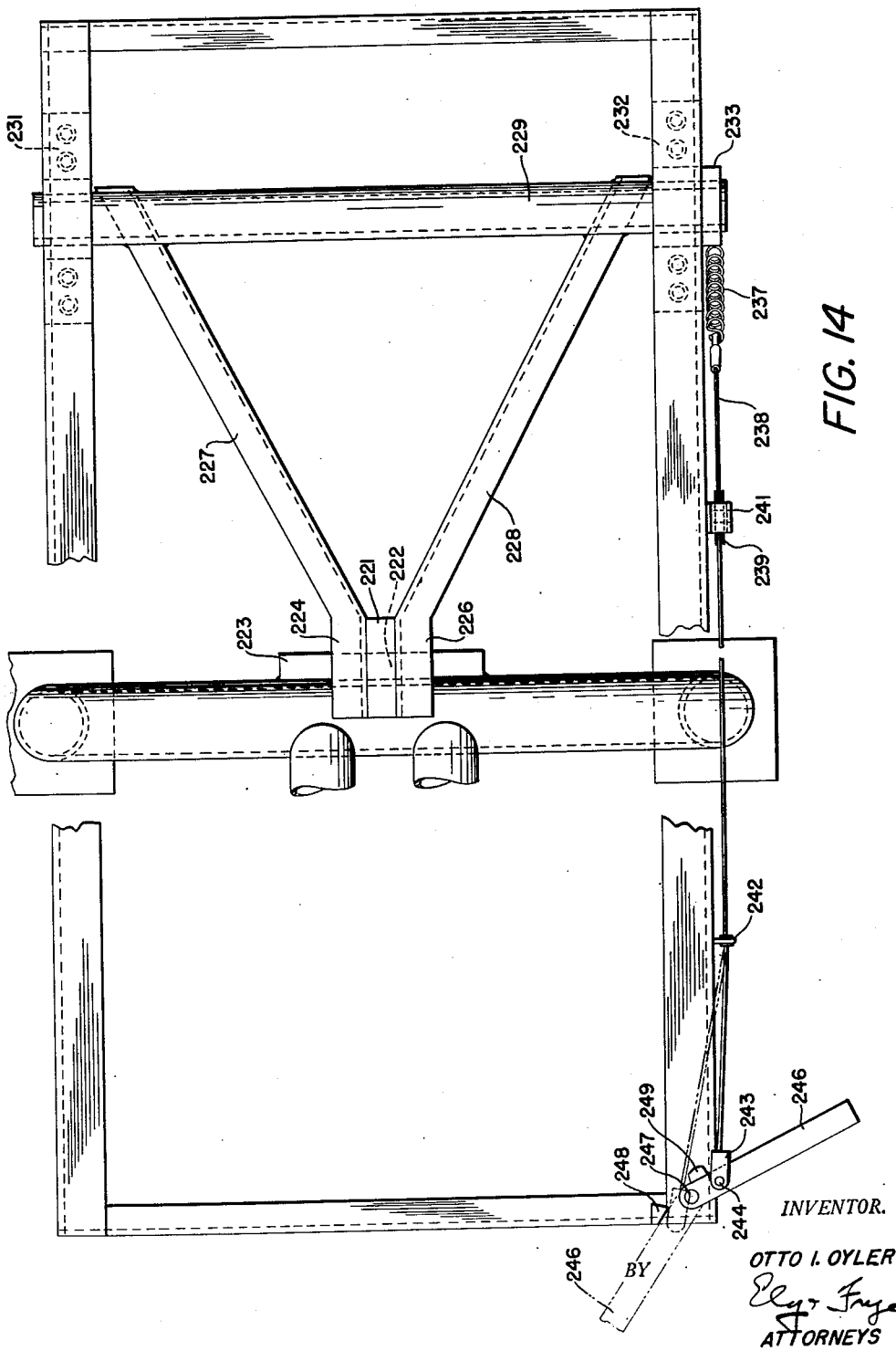

These and other objects are attained by the invention, preferred forms of which are described in the following specification and illustrated in the drawings, in which:

Fig. 1 is a partial view, in side elevation, of a trailer chassis, with wheels on the near side removed, Fig. 2 is an enlarged, sectional view, taken on the line 2—2 of Fig. 1, Fig. 3 is an enlarged, top plan view of the rear end of the chassis of Fig. 1, with parts broken away, Fig. 4 is an enlarged, sectional view taken on the line 4—4 of Fig. 1, Fig. 5 is a view in side elevation of the rear end of a modified bogie suspension, with the near girder of the trailer chassis broken away, Fig. 6 is a sectional view taken on the line 6—6 of Fig. 5, showing the bogie-locking mechanism, Fig. 7 is a top plan view of the mechanism of Fig. 6, Fig. 8 is a top plan view of Fig. 5, with parts broken away, Fig. 9 is a sectional view taken along the line 9—9 of Fig. 5, Fig. 10 is a rear elevation of Fig. 5, with parts centrally of the figure broken away, Figs. 11 and 12 are views similar to Fig. 10, showing modified hanger elements, Fig. 13 is a view similar to Fig. 5, showing a modified locking means for the rear bogie, and Fig. 14 is a top plan view of Fig. 13.

Referring to the drawings by characters of reference, there is shown a vehicle chassis, indicated as a whole by the numeral 10, and which may be part of either a truck or a tractor-drawn trailer. The chassis comprises a pair of longitudinal channel girders 11 and 12 and, whereas only a portion of the chassis is shown, sufficient to illustrate the undercarriage elements which feature the invention, it will be understood that the side girders will have suitable cross bracing elements, such as channel 15, for instance.

The undercarriage comprises a pair of bogies mounted in tandem, with the rear bogie overlapping the front bogie, and joined by a cross linkage permitting substantial universal movement, in the general manner described in my aforesaid patent.

The front bogie has a main frame, indicated as a whole by the numeral 13, and associated with this frame is a pair of front wheels 14, the near wheel of this pair being removed in Fig. 1 to better show the inner parts of the suspension. Likewise, the rear bogie has a main frame, indicated as a whole by the numeral 16, and comprises a pair of wheels 17, the near wheel in this case also being removed in Fig. 1.

Axle 18 of front wheels 14 is secured to a pair of conventional leaf springs 19, by saddles which are indicated as a whole by the numeral 21, and the front ends of the leaf springs are anchored in brackets 22 secured to and depending from the underside of chassis girders 11, 12. The rear ends of springs 19 are attached to the front end of bogie frame 13 in a manner presently to be explained. Conventional stabilizers, one of which is indicated as a whole by the numeral 20, may be provided at each end of the front wheel suspension.

Front bogie frame 13 comprises a pair of longitudinal girders 23, 24 of I section, joined by a vertical cross plate 26 near their rear ends. Rearwardly of cross plate 26, the girders 23, 24 taper downwardly as at 27, on their upper sides, and forwardly of plate 26 they taper upwardly, as at 28, on their lower sides. At their forward ends, the webs of girders 23, 24 have recesses of semi-circular form, receiving a transverse, tubular shaft 29, the flanges of the girders being wrapped around the frontward side of the shaft, and welded as at 31, so that the shaft constitutes a cross-brace for the front end of the bogie.

The ends of shaft 29 are received and secured in aligned bores in a pair of upright brackets, each comprising an outer plate 32 and an inner plate 33, the plates in each bracket being joined by a cross piece 34 of arcuate section, and the inner plate 33 in each case being joined to the upper flange of the adjacent bogie girder by a triangular gusset 36. A pin 37 extends between plates 32 and 33, in spaced relation to cross piece 34, and the rear end of spring 19 extends between the cross piece and the pin, and two leaves of the spring have downwardly curved ends at 35, hooked around the pin.

The rear end of front bogie 13 rocks about a transverse, horizontal axis and is articulated to the chassis 10 as follows: Since the articulating structure as a whole is identical on each side of the vehicle, except for being arranged in a contrary sense, only the structure on one side need be described. Thus, to the top of girder 23 of the front bogie is bolted a plate 38 (Fig. 4), which extends transversely outwardly of the girder, the extending portion being supported by a triangular bracket 39 welded to the girder. Bolted to the plate 38 is a bearing block 41 journaling a pivot pin 42. The pivot pin is connected to the chassis by a pair of depending straps 43, having aligned bores received on the ends of the pivot pin astride bearing block 41. The straps are welded to a plate 44, which is secured by bolts 45 to a plate 46 of generally T-form, inverted, with a vertical arm 47 which is secured by bolts 40 to chassis girder 11. Pivot pin 42 is provided with a pair of transverse bores receiving pins 48, which retain it against moving axially out of the bearing block, and a pair of lugs 49 on one of the straps 43 engages a pin 48 to restrain it against rotation relative to straps 43, thus providing for rotation of the pin in the bearing block. It will be seen that the only possible motion for the front bogie is a motion of oscillation about the common axis of pivot pins 42, with this motion limited by springs 19 and also by the rear bogie, as will appear. It will be noted that plate 44 has an excess of openings 50 for receiving bolts 45. This enables mounting the trunnion at selective locations along the chassis to adjust the suspension for optimum load balance.

Besides being pivoted to the chassis 10 by pins 42, the front bogie is articulated to rear bogie 16 by a link 51, and the rear bogie is articulated to chassis 10 by a link 52. The pivoting of links 51 and 52, as will presently be explained, is such that the rear bogie is rockable about an axis longitudinally of the chassis, as well as about a transverse axis and a vertical axis.

The framework of the rear bogie comprises a pair of channel members 53, 54, running longitudinally of chassis 10 when in normal alignment, and so spaced apart that they lie well within the girders 11, 12 forming the sides of the chassis. Girders 53, 54 are secured, at their rear ends, to the top plate 56 of a truss having rearwardly slanted, outwardly diverging legs 57, 58 of channel section, the lower ends of which are each welded to an axle yoke plate 59. The axle 61 of the rear bogie is secured to plates 59 by bolts 62 and lower plates 63. The truss is strengthened by a back plate 64 welded to the legs 57, 58 and by an inner, lower plate 66, welded to the truss legs, and to the lower faces of girders 53, 54.

At the forward end of rear bogie 16, a cross member 67 of channel section is welded to girders 53 and 54, and this cross member has extensions comprising a pair of forwardly diverging arms 68, 69, also of channel section. Arms 68, 69 carry, at their forward extremities, vertically arranged tubes 71, 72, which mate within the pockets of semi-tubular sections 73, 74 welded, respectively, to pairs of diverging plates 76, 77 and 78, 79, which are in turn welded to a cross member 80 extending between girders 11 and 12 of the chassis and reinforced by gussets 81. The construction just described provides the "heel and toe" action shown and claimed in my Patent No. 2,252,135 in which the wheel suspension has two distinct centers of turning, offset from the center line of the chassis, embodied in the tubes 73 or 74 when engaged by the tubes 71 or 72, respectively.

Pivotal mounting, on the rear bogie, for link 51 connecting the two bogies, is provided on a cross channel 82, on a pair of channel risers 83, 84 on girders 53, 54. A top plate 86 on cross channel 82 carries a pair of upright brackets 87, with axially aligned bores receiving a pivot pin 88. A circular opening 89 through plate 86 and cross channel 82 receives the link 51, which has a bore 90 receiving pin 88, the bore being flared at each end as indicated by the numeral 91 so that link 51 may rock angularly to the axis of pin 88, as well as revolve about said axis.

For the lower pivotal mounting of link 51, front bogie 13 carries, at its rear end, a depending, transverse strap 92 of channel section, in the general form of an inverted arch, which is secured to bogie girders 23 and 24, and has an opening 100 through which link 51 passes. A pair of brackets 93, depending from strap 92, mount a pin 95 on which the lower end of link 51 is pivoted, the opening in the link receiving pin 95 being doubly flared at 94, as in the upper part of the link and for the same purpose.

Front link 52 of the articulating system has a doubly flared bore 96 receiving a pin 97, which is mounted in a pair of upright brackets 98 on a shelf 99, secured to cross-channel 15, the shelf being braced by a gusset 102. The lower end of link 52 has a doubly flared opening 103, receiving a pin 104, supported in a pair of brackets 106 depending from a plate 107. The latter is secured to the rear bogie through a rigid structure comprising a channel 108 depending from cross member 67 at the front of the bogie, and a pair of diagonally arranged bars 109 secured to the girders 53, 54 of the bogie.

A modified form of suspension is shown in Figs. 5, 8 and 10. In this form the chief point of difference is the provision of a pair of suspending links or hangers between the rear bogie and the front bogie, instead of the single link previously described. These dual links (Fig. 10) are indicated generally by the numerals 111 and 112. The main frame of the rear bogie is of tubular construction, with a top frame comprising two parallel, forward tubes 113, 114 and rear tubes 116, 117 aligned with the respective, forward tubes. Attached to and spacing the pairs of tubes apart is a housing of channel form indicated generally at 118. The latter, which is arranged transversely of the bogie, comprises a front plate 119, a rear plate 121, and a top plate 122 at a considerable level above the bogie and from which hangers 111, 112 are suspended, as will be explained. Plates 119, 121 are reinforced in their attachment to the tubes by four gussets 123 and are joined together by a plate 124 within housing 118. Front tubes 113, 114 are welded to the "heel and toe" channel member 67', and rear tubes 116, 117 are welded to a cross tube 126, to the ends of which are welded vertical struts 127, 128 supported on the saddles 129, 131 of rear axle 132.

To the underside of upper plate 122 is attached a pair of depending lugs 133, 134 lying in a common plane and spaced on either side of the center line of housing 118. Each lug is bored to receive a pin 136, from which pins the hangers 111, 112 are suspended. Since the hangers are identical, only one need be described. A clevis 137 is mounted on pin 136 and a second clevis 138 is in looped engagement with the first clevis so as to depend therefrom. The second clevis supports a pin 139 carried by a T member 141. The shank 142 of the latter is threadedly received in the upper end of a tubular main hanger body 143. The upper end of the latter has a longitudinal slot 144 so that it may be tightened in adjusted position on shank 142, and to this end the body 143 has lugs 146 adjacent slot 144 bored to receive a bolt 147. The lower half of the hanger is identical with the upper half and the respective parts thereof bear the same reference numerals as the corresponding parts in the upper half. Lowermost pin 136 is carried by an upright lug 148 on a cross channel 149 secured between and at the bottom of a pair of plates, the forward plates 151 of which is welded to the underside of chanels 23, 24 and the rearward plate 152 being welded to the rear edges of channels 23, 24.

It will be seen that the lugs supporting the terminal ends of the rear hangers are so positioned that the hangers 111, 112 diverge in a downward direction, being further apart at the bottom than at the top.

Channel 108', depending from the channel 67' is similar to, but somewhat longer than channel 108 in Fig. 1, and a single tube 153 connects its lower end with plate 119 on the rear bogie. A hanger 154, identical with hangers 111, 112 connects channel 108' to the trailer chassis, being attached at its lower end to a pin 156 carried by a lug 157 on channel 108', and at its upper end to a pin 158 carried by a lug 159 on channel 15.

The construction of the main trunnion is seen in Figs. 5 and 9. One trunnion only need be described. Thus, a plate 159, carried by beam 23 of the front bogie, has welded onto its upper face a tube 161 with axis arranged transversely of the bogie. Nested on tube 161 is a half-cylinder 162 which is welded to a plate 163, secured to the lower flange of channel 11 of the trailer chassis. A retaining bolt 164 is received in aligned bores in end faces 160 of half-cylinder 162, passing through tube 161 and held by a nut 165. This arrangement makes for quick assembly or disassembly. In the rocking action about the trunnion axis, the half-cylinder rotates on the tube. Contact of bolt 164 with the inside of the tube will seldom occur, but to take care of this contingency, the bolt is surrounded by a roller sleeve 166.

It will be noted that the rear bogie slants upwardly in a rear-to-front direction and that the "heel and toe" units lie above the bottom level of the trailer chassis girders 11, 12. Each "heel" unit comprises a curved plate 167 providing a flared opening to receive the toes, plate 167 being welded to spaced, parallel, vertical plates 168, 169, 170 welded to cross channel 15 and arranged longitudinally of the chassis. A top plate 171 welded to cross channel 15 is provided over each set of plates 168—170 to further strengthen these plates and to provide a limit for upward movement of the "toes." The latter, and their mounting, are in general the same as those in the Fig. 1 modification, channel 67' being welded to front tubes 113, 114 of the rear bogie.

The most important feature of the modification shown in Figs. 5, 8 and 10 is the provision of the dual rear hangers. This gives a connection between the two bogies involving moment arms measured to the central vertical plane of the bogies, which materially resists the tendency of the trailer to rock sidewise, or to lean in rounding a curve.

The provision of identical hangers throughout the suspension results in lower manufacturing costs, and the adjustable features enable setting up a suspension at correct load balance for any given job within fine tolerances. Increasing the length of the hangers lowers the lifting effect occasioned by arcuate swing of the lower ends of the hangers. Also, the clevis or chain-link arrangement in the hangers gives sufficient freedom of movement, while obviating the use of costly universal connections and reducing the cost and labor involved in lubricating.

In Fig. 11 there is shown a modification of the dual rear hangers in which the mounting is resilient. The hangers, respecting the structure of their upper mountings are the same as those shown in Fig. 10. The lower end of each hanger extends through an opening 175 in a cylindrical housing 172 secured to channel 149 in inclined position, so as to be axially aligned with the hanger, and braced by a gusset 173. The hanger is threaded on its lower end to receive a nut 174 behind a washer 176. A helical spring 177 surrounds the hanger above the washer and abuts the top cover of the housing 172. This spring may be preloaded in compression by means of nut 174. For access to the nut, an opening 178 is provided in channel 149. The spring provides a resilient connection which avoids abrupt stressing when the dual hangers act to damp or resist side sway of the trailer.

Still another modification of the rear hangers is shown in Fig. 12. This construction involves three hanger elements, including two outer, inclined elements 179, 181, and a central, vertical element 182. The latter is similar to elements 111, 112 of Fig. 10, and similar reference characters are employed in the two cases to identify similar parts, the only essential difference being that lug 183 is located in the central plane of the bogie.

The outer hangers each comprise a lower, rigid element 186 having a resilient mounting similar to the hangers in Fig. 11. However, connecting this element with the rear bogie is an upper section comprising chain links 187. The lower link of the chain is secured by a bolt 188 in the forked upper end of element 186, and the upper link of the chain is secured by a bolt 189 carried by a clevis 191 suspended on a clevis 190 on a pin 192 carried by a lug 193, carried by plates 194 secured to plates 119' and 121'.

This form partakes of the features of both the single, rear hanger and the spaced, dual, rear hangers. Central hanger 182 provides a rigid connection which functions the same as the single rear hanger in the Fig. 1 modification, but upon swaying of the vehicle the chain hangers are brought into play and resiliently resist such swaying.

In a vehicle having a loosely articulated, rear wheel suspension of the type shown, driving in reverse gear becomes a matter of some difficulty and, except in special cases where backing and turning involves close quarters, it is desirable to eliminate all turning of the rear bogie about a vertical axis. To this end a locking system, which may be thrown in or out at will, is provided, and one form of such device is illustrated in Figs. 5–8. The system comprises a movable male element carried by the trailer chassis, and a fixed female element carried on the rear end of the rear bogie, the arrangement being such that when the elements are interengaged, the rear bogie is in effect locked to the trailer chassis against turning about a vertical axis.

As seen in Fig. 5, the female element comprises a plate 194 welded to the rear face of bogie frame tube 126, and thus lying outboard of the bogie, and arranged vertically. The upper end of the plate has two tapered shoulders 196 and a central slot 197 with tapering sides which provide a top opening narrower than the base of the slot. The male element, which is received in slot 197 to lock the bogie, comprises a pin 198, of a length considerably greater than the thickness of plate 194, secured to the end of an arm 199 and arranged transversely thereto. Arm 199 comprises a base plate 201 and a central upright plate 202 defining a cross-section of T-form. The end of the arm remote from pin 198 has secured thereto a tube 203, which is mounted on and keyed to a shaft 204, the latter being journaled in a cross channel 206 of the chassis, and in an upright plate 207, spaced from channel 206 and secured to channel girder 12 of the trailer chassis. A top plate 208 is connected to plate 207 and channel 206 to stabilize the former. Shaft 204 extends somewhat rearwardly of channel 206, and keyed to the shaft near its outer end is a short lever 209. Thus, levers 199 and 209 constitute a bell crank, and swinging of the latter causes pin 198 to move into or out of slot 197.

Pin 198 is normally held in raised position, out of slot 197, by means of a coil spring 211 secured to arm 199 and to the bent end of a plate 212 secured to channel 206. Lever 209 is moved to insert pin 198 in slot 197 by means of a vacuum cylinder 213 pivoted on a pin 214 held between a pair of lugs 216 secured to trailer chassis girder 11. Piston rod 217 of the cylinder has threaded on its end a clevis 218 which is pivotally connected to lever 209. A vacuum line 219 leads from the cylinder to the tractor or truck engine and an appropriate valve control is located in the driver's compartment.

When the valve is set to provide low pressure on the left side of the piston in cylinder 213, piston rod 217 moves to the left (Fig. 6), turning lever 209 counterclockwise and also moving arm 199 counterclockwise agianst the tension of spring 211. If the pin and slot are not aligned, it is merely necessary to drive the vehicle forward slightly, and the pin will drop in the slot. The diverging walls of the slot ensure retention of the pin in the slot when it is subjected to laterally directed forces in the backing-up operation.

After backing up, the vacuum in cylinder 213 may be relieved, but in general the pin will not be raised from the slot immediately, being wedged by a laterally directed force. However, when forward motion of the vehicle is next commenced, the force will be relieved and the pin will rise at the beginning of such motion.

It will be noted that the entire locking mechanism is located rearwardly of the rear bogie frame. This is to prevent the pin from falling in front of cross piece 116 of the bogie frame when the latter is moved rearwardly due to swinging of the bogie about one of the offset centers defined by the "heel and toe" action. However, where the cross-piece is of sufficient extent, as in the Fig. 1 modification for instance, it will be possible to locate the locking mechanism on top of the cross member.

A still further modified form of locking device is shown in Figs. 13 and 14 which is particularly adapted to compensate for up and down movement of the trailer chassis with respect to the rear bogie. In this form, a plate 221 adapted for insertion in the slot 222 of a locking plate 223, generally similar in form and location to plate 194 of Figs. 5 and 6, is secured between a pair of angle bars 224, 226 having respective, diverging portions 227, 228 welded at their ends to a tube 229 extending entirely across the chassis frame and journaled in saddles 231, 232 riveted to the under side of opposite elements of the chassis frame.

Secured to one end of tube 229, exteriorly of saddle 232, is a lever 233 which, with arms 227, 228, constitutes a bell crank for swinging plate 221. Mounted on a pin 234 near the outer end of lever 233 is an eye-bolt 236, anchoring one end of a tension spring 237, the other end of which is secured to a pull cable 238. The latter is trained over a guide pulley 239, journaled in a bracket 241 secured to the trailer frame, and passes through a guide ring 242, also secured to the frame, and on to the front of the said frame where it is secured to a clevis 243 journaled on a pin 244 carried by a hand lever 246 pivoted on a stub shaft 247 on the top of the frame, at a corner thereof. Stops 248 and 249 limit clockwise and counterclockwise swing, respectively, of lever 246.

When lever 246 is in the position shown in broken lines in Fig. 14, plate 221 and arms 227, 228 are in the position shown in broken lines in Fig. 13, raised above position of engagement with slot 222 of plate 223, where it is held by the tension of spring 237. In this position, lever 246 is past dead center and the system is effectively held in this condition by spring 237. If it is desired to lock the bogie for a backing-up operation, the driver merely moves lever 246 counterclockwise until it is past dead center, whereupon plate 221 and arms 227, 228 fall of their own weight. If plate 221 is not aligned with slot 222, it is merely necessary to move the trailer forwards or backwards slightly to effect proper alignment so that the plate will fall in the slot.

Unlocking is effected by clockwise movement of lever 246. In general, plate 221 will be in tight frictional engagement with a side of slot 222 after a backing-up operation. However, the lever 246 may nevertheless be moved to contact stop 248 with spring 237 yielding in tension. At the first forward movement of the vehicle thereafter, the friction between the plate and slot will be relieved and spring 237 will withdraw the plate.

While certain preferred embodiments of the invention have been shown and described, the invention is not limited thereby since changes in the size, shape and arrangement, for instance, of the various parts may be resorted to without, however, departing from the spirit or full scope of the invention.

What is claimed is:

1. In combination, a vehicle chassis, trunnion means adjustably carried by said chassis and defining a horizontal turning axis arranged transversely of said chassis, a front bogie mounted for pitching motion on said trunnion means, a rear bogie having link means suspending a portion of said front bogie rearwardly of said trunnion means, a link connecting said rear bogie with said chassis forwardly of said trunnion means, a rear axle carried by said rear bogie, a front axle having springs, the portion of said front bogie forwardly of said trunnion means being connected only to the rear portion of said springs, and the front portion of said springs being connected to said chassis, said springs constituting the only spring means supporting the load on said axles.

2. In a vehicle, a chassis, a front bogie mounted on said chassis on a trunnion axis located intermediate the length of said front bogie, a rear bogie having an articulated suspending connection with said chassis, and an articulated, suspending connection between said rear bogie and said front bogie, said latter connection comprising a pair of link members each located outwardly of the longitudinal, central plane of said rear bogie and said members inclined so as to diverge from one another in a direction downwardly from their connection with said rear bogie.

3. In a vehicle, a chassis, a front bogie mounted on said chassis on a trunnion axis located intermediate the length of said front bogie, a rear bogie having an articulated suspending connection with said chassis, and an articulated, suspending connection between said rear bogie and said front bogie, said latter connection comprising a pair of link members each located outwardly of the longitudinal, central plane of said rear bogie, said link members inclined so as to diverge from one another in a direction downwardly from their connection with said rear bogie, said link members comprising a resilient element through which tensile forces are transmitted from one bogie to the other.

4. In a vehicle, a chassis, a front bogie mounted on said chassis on a trunnion axis located intermediate the length of said front bogie, a rear bogie having an articulated suspending connection with said chassis, and an articulated, suspending connection between said rear bogie and said front bogie, said latter connection comprising a pair of link members each located outwardly of the longitudinal, central plane of said rear bogie, said link members inclined so as to diverge from one another in a direction downwardly from their connection with said rear bogie, and a third link member between said front and rear bogies, positioned intermediate said pair of link members.

5. In a vehicle, a chassis, a front bogie mounted on said chassis on a trunnion axis located intermediate the length of said front bogie, a rear bogie having an articulated suspending connection with said chassis, and an articulated, suspending connection between said rear bogie and said front bogie, said latter connection comprising a pair of link members each located outwardly of the longitudinal, central plane of said rear bogie, said link members inclined so as to diverge from one another in a direction downwardly from their connection with said rear bogie, and a third link member between said front and rear bogies, positioned intermediate said pair of link members and said pair of link members each having a resilient element transmitting tensile forces between said bogies.

6. In a vehicle, a chassis, a front bogie mounted on said chassis on a trunnion axis located intermediate the length of said front bogie, a rear bogie having an articulated suspending connection with said chassis, and an articulated, suspending connection between said rear bogie and said front bogie, said latter connection comprising a pair of link members each located outwardly of the longitudinal, central plane of said rear bogie, said link members inclined so as to diverge from one another in a direction downwardly from their connection with said rear bogie, and a third link member between said front and rear bogies, positioned intermediate said pair of link members and said pair of link members each having a resilient element transmitting tensile forces between said bogies and each comprising a length of chain links.

7. In combination, a vehicle chassis, trunnion means carried by said chassis and defining a horizontal turning axis arranged transversely of said chassis, a front bogie mounted for pitching motion on said trunnion means, a rear bogie having link means suspending a portion of said front bogie rearwardly of said trunnion means, the connecting portions of said link means comprising pins mounted in members having openings with flared mouths, a link connecting said rear bogie with said chassis, a rear axle carried by said rear bogie, a front axle, means connecting the portion of said front bogie forwardly of said trunnion means with said front axle, and means connecting said front axle with said chassis.

8. In combination, a vehicle chassis, trunnion means carried by said chassis and defining a horizontal turning axis arranged transversely of said chassis, a front bogie mounted for pitching motion on said trunnion means, a rear bogie having link means suspending a portion of said front bogie rearwardly of said trunnion means, and comprising a pair of links, each located outwardly of the central, longitudinal, vertical plane of said bogies, said links inclined so as to diverge from one another in a direction downwardly from their connection with said rear bogie, a link connecting said rear bogie with said chassis, a rear axle carried by said rear bogie, a front axle, means connecting the portion of said front bogie forwardly of said trunnion means with said front axle, and means connecting said front axle with said chassis.

9. In combination, a vehicle chassis, trunnion means carried by said chassis and defining a horizontal turning axis arranged transversely of said chassis, a front bogie mounted for pitching motion on said trunnion means, a rear bogie having link means suspending a portion of said front bogie rearwardly of said trunnion means, and comprising a pair of links, each located outwardly of the central, longitudinal, vertical plane of said bogies, said links inclined so as to diverge from one another in a direction downwardly from their connection with said rear bogie, and each link comprising a resilient element for transmitting tensile forces between the bogies, a link connecting said rear bogie with said chassis, a rear axle carried by said rear bogie, a front axle, means connecting the portion of said front bogie forwardly of said trunnion means with said front axle, and means connecting said front axle with said chassis.

10. In combination, a vehicle chassis, trunnion means carried by said chassis and defining a horizontal turning axis arranged transversely of said chassis, a front bogie mounted for pitching motion on said trunnion means, a rear bogie, the forward portion of said rear bogie overlying the rear portion of said front bogie and having a pair of link members suspending a portion of said front bogie rearwardly of said trunnion means, each of said link members located outwardly of the longitudinal central plane of said rear bogie, a link connecting said rear bogie with said chassis forwardly of said trunnion means, a rear axle carried by said rear bogie, a front axle, means connecting the portion of said front bogie forwardly of said trunnion means with said front axle, and separate means connecting said front axle with said chassis.

11. In combination, a vehicle chassis, trunnion means carried by said chassis and defining a horizontal turning axis arranged transversely of said chassis, a front bogie mounted for pitching motion on said trunnion means, a rear bogie having link means suspending a portion of said front bogie rearwardly of said trunnion means and comprising a pair of resilient links, each located outwardly of the central, longitudinal, vertical plane of said bogies, and a link interediate said resilient links, a link connecting said rear bogie with said chassis, a rear axle carried by said rear bogie, a front axle, means connecting the portion of said front bogie forwardly of said trunnion means with said front axle, and means connecting said front axle with said chassis.

12. A vehicle of the type having a chassis and tandem bogies, each having a connection with the chassis and a mutual connection, whereby the front bogie may partake of a pitching motion relative to the chassis, and said rear bogie may partake of pitching, yawing, or rolling motion, resilient means connecting the forward portion of said front bogie with said chassis, and said mutual connection comprising a pair of links, each located outwardly of the central, vertical, longitudinal plane of said bogies, said links inclined so as to diverge from one another in a direction downwardly from their connection with said rear bogie.

13. In combination, a vehicle chassis, trunnion means carried by said chassis and defining a horizontal turning axis arranged transversely of said chassis, said trunnion means comprising a tube on the front bogie, a cylindrical saddle on the vehicle chassis comprising 180° or less of arc and nested on said tube, and means loosely interlocking said cylinder and said tube, a front bogie mounted for pitching motion on said trunnion means, a rear bogie having link means suspending a portion of said front bogie rearwardly of said trunnion means, a link connecting said rear bogie with said chassis, a rear axle carried by said rear bogie, a front axle having springs, means connecting the portion of said front bogie forwardly of said trunnion means with said springs, and means connecting said springs with said chassis, said springs constituting the only spring means supporting the load on said axles.

14. In combination, a vehicle chassis, trunnion means carried by said chassis and defining a horizontal turning axis arranged transversely of said chassis, said trunnion means comprising a tube on the front bogie, a cylindrical saddle on the vehicle chassis comprising 180° or less of arc and nested on said tube, and means loosely interlocking said cylinder and said tube, said cylinder having end faces and said interlocking means comprising an element carried by said end faces and passing through said tube, a front bogie mounted for pitching motion on said trunnion means, a rear bogie having link means suspending a portion of said front bogie rearwardly of said trunnion means, a link connecting said rear bogie with said chassis, a rear axle carried by said rear bogie, a front axle having springs, means connecting the portion of said front bogie forwardly of said trunnion means with said springs, and means connecting said springs with said chassis, said springs constituting the only spring means supporting the load on said axles.

15. In combination, a vehicle chassis, trunnion means adjustably carried by said chassis and defining a horizontal turning axis arranged transversely of said chassis, a front bogie mounted for pitching motion on said trunnion means, a rear bogie having link means suspending a portion of said front bogie rearwardly of said trunnion means, a link connecting said rear bogie with said chassis forwardly of said trunnion means, a rear axle carried by said rear bogie, a front axle, means connecting the portion of said front bogie forwardly of said trunnion means with said front axle, a separate means connecting said front axle with said chassis, and lock means comprising a first element on said chassis and a second element on said rear bogie, said elements positioned for interengagement only when said rear bogie is longitudinally aligned with said chassis.

16. In a trailer combination having a rear bogie mounted for substantial swing about a vertical axis, a locking device comprising a locking plate carried by an arm mounted for swinging movement about a horizontal axis, means on said bogie for receiving said plate in bogie-locking relation, means for rocking said arm, said means including a serially connected, resilient means, a lever for operation of said rocking means, and stop means for said lever located past a dead center whereby said resilient means urges said lever against said stop.

References Cited in the file of this patent

UNITED STATES PATENTS

| | | |
|---|---|---|
| 1,763,768 | Fager | June 17, 1930 |
| 1,940,914 | Marcum | Dec. 26, 1933 |
| 2,361,166 | Ayers | Oct. 24, 1944 |
| 2,424,141 | Black | July 15, 1947 |
| 2,460,429 | Oyler | Feb. 1, 1949 |
| 2,493,026 | Pointer | Jan. 3, 1950 |
| 2,552,483 | Harrah | May 8, 1951 |

FOREIGN PATENTS

| | | |
|---|---|---|
| 395,144 | Great Britain | July 13, 1933 |